July 28, 1959 M. L. TOLF 2,897,037
RECORDING MEANS
Filed July 27, 1955
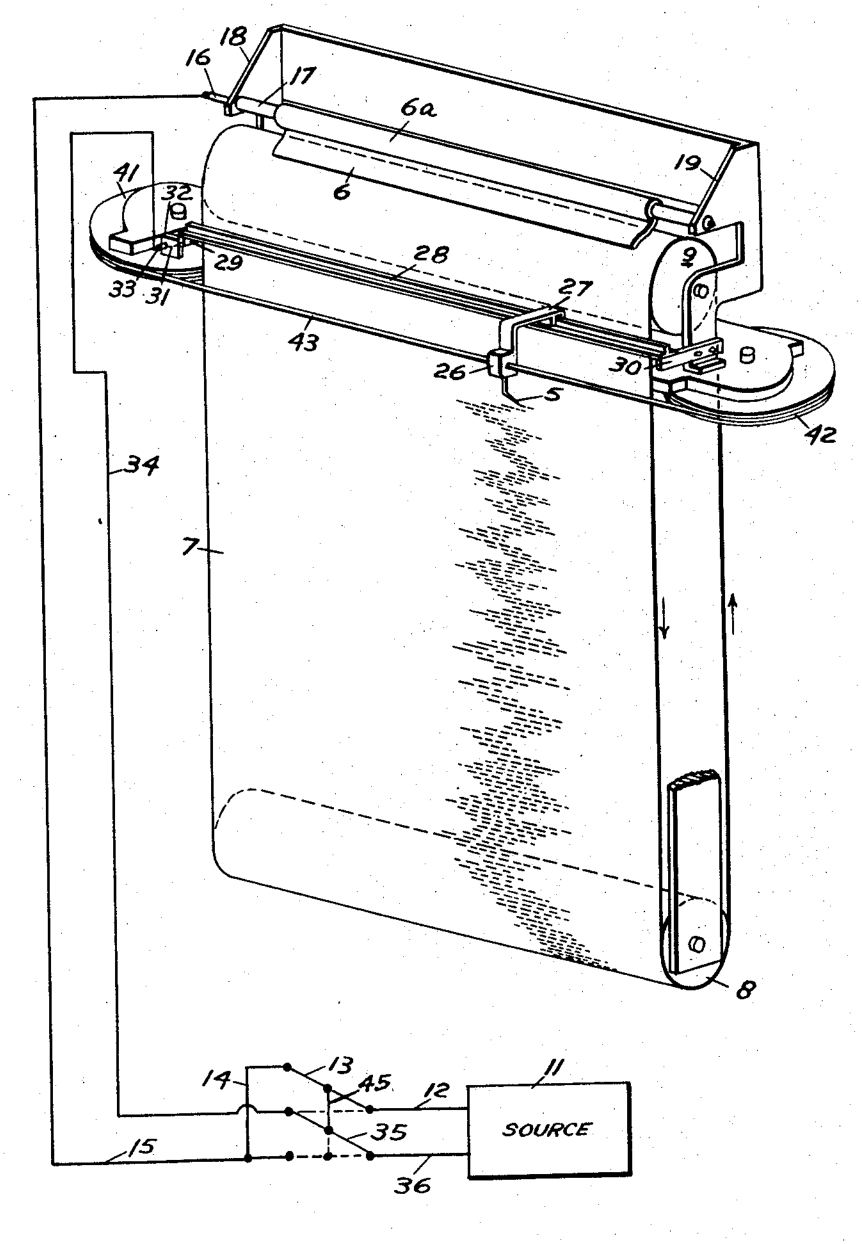
INVENTOR
MARVIN L. TOLF
BY Elmer J. Gorn
ATTORNEY 2,897,037

RECORDING MEANS

Marvin L. Tolf, South Acton, Mass., assignor to Raytheon Manufacturing Company, Waltham, Mass., a corporation of Delaware Application July 27, 1955, Serial No. 524,730

1 Claim. (Cl. 346—21)

This invention relates to recording devices, and particularly to electrical recorders employing an electrically actuated stylus adapted to produce visible marks upon a record sheet, or chart, as relative motion occurs therebetween.

The invention utilizes the discovery that when electrical current is passed between two points on a thin sheet of paper or paper-like material, whose constituent surfaces have been treated to absorb (or adsorb) certain electrically conductive, or catalytic, material, the act of removing the current from the sheet, by way of a negative electrode, causes a coloration of the sheet at the point of current take-off, while a reverse flow produces no such coloration and, moreover, removes any color effect theretofore produced at such point.

The electrically conductive, or catalytic, material presently used in practicing this invention is a concentrated solution of alcohol and turmeric in which the chart is soaked. The chart is then removed from the solution and dried and subsequently redampened with distilled water; but it is entirely probable that other preparations could be applied to the chart with like effect.

In the illustrated mechanism embodying the invention, a chart in the form of an endless loop of constantly moving paper is constantly engaged by two spaced styli connected in an electric circuit in such a manner that one serves as a writing stylus and the other as an erasing stylus, the latter being of sufficient breadth to embrace all areas on the paper where stylus marks may appear.

Other and alternate arrangements of parts embodying the invention and other objects and capabilities thereof will be apparent upon reference to the following detailed description of the invention as embodied in the mechanism illustrated in the accompanying drawing.

In the said drawing, reference numerals 5 and 6 designate the two styli engageable with an endlessly looped sheet 7 carried on rollers 8 and 9, one of which is driven by an electric motor-driven speed reduction unit (not shown) in accordance with practice conventional in the art to cause chart 7 to move at a uniform rate downwardly past the stylus 5 and to receive a succession of spaced "dash" marks applied by said stylus as electric current in separated pulse form pulses through an electronic transmission circuit including a source 11, positive conductors 12, 13, 14, and 15, terminal post 16, conducting rod 17 (insulatedly supported on brackets 18, 19) and stylus 6, consisting of a cylindrical part 6a surrounding rod 17 and the chart-engaging part 6 of resilient metallic material (or, alternatively, spring-biased) for firm engagement with the chart 7. The circuit also includes the chart 7 which is made electrically conductive by reason of the catalytic effect of the alcohol-turmeric solution, above referred to, that becomes absorbed within or upon the fibers or interstices of the material constituting the chart. The pulse current (which may represent "sound echo," as in the system exemplified in U.S. Patent No. 2,561,851) is removed from the chart by way of the stylus 5, serving in this case as a negative electrode, and from this electrode 5 the current returns to source 11 by way of the stylus carriage 26, stylus contact shoe 27, and conducting rail 28 being supported upon end brackets 29 and 30 and serving as a guide track for contact shoe 27 as well as being the current-conducting link between said shoe 27 and the conducting bracket 29. From conducting bracket 29 the current path proceeds by way of bridging members 31 within box 32 to terminal post 33 and back to the source by way of negative return conductors 34, 35 and 36.

The illustrated stylus carriage is caused to move laterally of the sheet 7 by pulley-driving means (not shown) conventional in the art (and illustrated in greater detail in, for example, U.S. patent application, Serial No. 119,905, filed October 6, 1949, now Patent No. 2,715,055, issued August 9, 1955), and operable to rotate pulleys 41 and 42 carrying cable 43 whose ends are secured to stylus carriage 26 for transverse actuation thereof.

As the marked areas of the sheet, traveling in the direction indicated by the arrows, ride under the stylus 6, they are cleared of all marks—assuming current to be flowing as above traced—and thus the chart presents a clean area to the stylus 5 throughout such a cycle. On the other hand, a shifting of switch 30 to the dash-line position will reverse the direction of current flow and cause stylus 5 to become an "erasing" positive electrode, and stylus 6 a "writing" negative electrode.

It will be understood, of course, that the contour, construction, and mechanical operating mechanisms for the styli 5 and 6 may vary in minor or major respects from those illustrated and described above, by way of presenting one only of many possible exemplifications of the invention. In this connection, it may be noted that the term "stylus" as used herein is intended to embrace either a writing or an erasing instrument, also it may designate an instrument operable alternately as a writing and as an erasing instrument. The term also embraces instruments with either relatively short (point-like) or relatively long chart-engaging edges.

This invention is not limited to the particular details of construction, materials and processes described, as many equivalents will suggest themselves to those skilled in the art. It is, accordingly, desired that the appended claim be given a broad interpretation commensurate with the scope of the invention within the art.

What is claimed is:

A recording mechanism comprising a chart in the form of an endless web having its recording surface impregnated with a substance which is responsive to a unidirectional flow of electric current to produce a discoloration and responsive to the flow of electric current in the reverse direction to remove such discoloration, carrier means on which said chart is mounted, said carrier means causing the recording surface of said chart to travel along a closed path, a movable marking stylus contacting the recording surface of the chart, means to translate said first stylus transversely to the direction of the chart surface movement, electrically conducting rail means supported by the carrier means to guide said marking stylus in its translatory movements relative to the chart, an erase stylus, electrically conductive means secured to said carrier means for supporting said erase stylus, said erase stylus being resiliently biased in its supported position into firm contact with the recording surface of the chart, said erase stylus being of sufficient width as to contact the recording surface of the chart over a distance substantially coextensive with the maximum extent of the transverse movement of which said marking stylus is capable while recording, a source of electrical potential, means to connect the negative side of said source of potential to the conductive support means for the erase stylus to render the erase stylus positive relative to the chart, and means to connect the positive side of said source of potential to the conductive guide rail support means for the marking stylus to render the marking stylus negative relative to the chart so that signals transmitted from the source cause the recording surface of the chart to be discolored by contact with the electrically negative marking stylus and cause any discoloration of the recording surface caused by the marking stylus to be removed by contact with the erase stylus, the marking and marking removal actions on the chart by the two styli being simultaneously effective at spaced positions on the recording surface of the chart.

References Cited in the file of this patent

UNITED STATES PATENTS

| | | |
|---|---|---|
| 1,068,774 | Hutchison | July 29, 1933 |
| 2,135,944 | Miles | Nov. 8, 1938 |
| 2,384,515 | Wise | Sept. 11, 1945 |

FOREIGN PATENTS

| | | |
|---|---|---|
| 537,691 | Great Britain | Nov. 18, 1940 |

UNITED STATES PATENT OFFICE

CERTIFICATE OF CORRECTION

Patent No. 2,897,037 Marvin L. Tolf July 28, 1959

It is hereby certified that error appears in the above numbered patent requiring correction and that the said Letters Patent should read as corrected below.

In the grant, lines 2 and 3, for "assignor to Raytheon Manufacturing Company, of Waltham, Massachusetts, a corporation of Delaware," read -- assignor to Raytheon Company, a corporation of Delaware, --; line 12, for "Raytheon Manufacturing Company, its successors" read -- Raytheon Company, its successors --; in the heading to the printed specification, lines 3, 4 and 5, for "assignor to Raytheon Manufacturing Company, Waltham, Mass., a corporation of Delaware" read -- assignor to Raytheon Company, a corporation of Delaware --.

Signed and sealed this 12th day of April 1960.

(SEAL)
Attest:

KARL H. AXLINE
Attesting Officer

ROBERT C. WATSON
Commissioner of Patents